Patented Nov. 2, 1926.

1,605,875

UNITED STATES PATENT OFFICE.

CHARLES URFER, OF GENEVA, SWITZERLAND.

CATALYST FOR THE SYNTHESIS OF AMMONIA.

No Drawing. Application filed May 29, 1923, Serial No. 642,348, and in Switzerland June 12, 1922.

When it is desired to prepare ammonia gas synthetically starting from its elements and when the reaction is carried out with or without pressure utilizing as catalysts powdered masses containing nitrides or amides of certain metals, it frequently happens that these bodies do not react at all at ordinary pressure with hydrogen, as is the case with the nitrides of magnesium, cerium and calcium, or if they do, the reaction is extremely slow yielding consequently only traces of ammonia. Among the compounds of this latter category, may be cited the nitride of lithium, the amides of strontium, barium, etc. The pressure obviously encourages the decomposition by hydrogen of these nitrogeneous compounds, but from the point of view of the apparatus which that necessitates it is more advantageous to work at ordinary pressure.

If it be desired to effect the synthesis of ammonia at ordinary pressure or at low pressures, it is then necessary to accelerate the decomposition by hydrogen of nitrides, amides or other metallic nitrogeneous products.

The present invention has for its object the provision of means for the acceleration of this decomposition and for augmenting the yield in ammonia by the process. The invention relates to processes for the synthetic production of ammonia of the kind wherein a mixture of hydrogen and nitrogen is caused to pass without appreciable pressure and at a relatively low temperature, i. e. lower than 600° C. over a catalyst formed by a powdered and homogeneous mass containing as the active constituent a nitrogeneous product of a metal which, when heated with nitrogen or ammonia gives directly a nitride or an amide and the nitride or amide of which decomposes when it is heated in a current of hydrogen. This active constituent is mixed intimately with an inert oxide which prevents it from fusing and which can be magnesia, alumina or lime. The characteristic feature of the invention consists in adding to the powdered mass a metal (likewise powdered) which has the property of accelerating the decomposition in hydrogen of the nitrogeneous product.

This metal may be lead, cadmium, bismuth, antimony, or commercial zinc powder, which may include lead, cadmium, bismuth, antimony, or any one or more of the same. This latter only acts by its impurities which are precisely bismuth, cadmium and lead. It is also possible to employ gold, copper and silver which react but with much less energy than the four metals cited in the first place.

These powdered metals may be prepared in the following manner:

With the exception of zinc, the oxide of which is difficult to reduce by hydrogen, all the other metals mentioned may be extracted from their oxides by heating in hydrogen.

To prevent certain of the metals, for example, bismuth, cadmium or lead from fusing during the reduction, their oxides are mixed with lime, magnesia or other oxides which are inert and difficult to reduce and reduction is then carried out by hydrogen. In this way a pulverulent mixture is obtained the metal of which owing to the presence of the lime or magnesia can be brought to a red heat without the metal exhibiting the least sign of fusion.

To prepare a catalytic mass containing the metals in question I may proceed in the following manner:

I mix a nitride or an amide in powder form or simply ground or even a body capable of fixing nitrogen, with any quantity of lead or cadmium, antimony, bismuth etc. intimately mixed with lime, magnesia, or some other inert oxide.

This powdered mass heated in a current of hydrogen yields ammonia by the decomposition of the nitride or the amide. It forms a mixture of the metal of the nitride or the amide and of the metal (Pb, Cd, Bi, etc.) added thereto; or if the nitrogenized metal can give a hydride, a mixture of this hydride and the metal added is formed. This mixture heated to a temperature not exceeding 600° C. immediately in a mixture of nitrogen and hydrogen, produces a catalytic synthesis of ammonia, the nitrogen of the gaseous mixture reproducing the nitride or amide decomposable by the hydrogen of the mixture in question.

By means of the process described, it is possible to transform integrally in hydrogen the nitride into the hydride or into metal or the amide into the hydride while the nitrogen of the nitride or of the amide splits off quantitatively in the form of ammonia which it does at temperatures varying according to the nitride or amide employed between 380° and 600° C.

As on the other hand the metal or the hydride set free in the course of these reactions may fix nitrogen again, and does so the better the more finely powdered the substance is, it will be understood that it is possible to effect the synthesis of ammonia without any pressure by causing to pass at a fixed temperature either a mixture of three volumes of hydrogen to one volume of nitrogen or alternately hydrogen and nitrogen over the catalyst. In actual fact the alkali-earth hydrides and the hydride of lithium heated in nitrogen give amides or nitrides according to the temperature employed. The metals then regenerate in the nitrogen the nitride which was started with.

It is to be understood that by the use of the term "metallic nitrogeneous product or compounds" as hereinbefore employed, I mean a nitride or an amide formed respectively by heating the metal forming its basis with nitrogen or ammonia. The metals which give these compounds are lithium, cerium, calcium, barium, and strontium.

I claim:

1. A catalyst for the synthesis of ammonia consisting of a powdered and homogeneous mass containing as an active constituent nitride of lithium, an inert non-fusing oxide intimately mixed with the nitride of lithium for preventing the agglomeration of the same, and a metallic powder which does not itself unite with nitrogen or hydrogen at ordinary pressure and at a temperature lower than 600° C.

2. A catalyst for the synthesis of ammonia consisting of a powdered and homogeneous mass containing as an active constituent nitride of lithium, calcium oxide intimately mixed with the nitride of lithium for preventing the agglomeration of the same, and a metallic powder which does not itself unite with nitrogen or hydrogen at ordinary pressure and at a temperature lower than 600° C.

3. A catalyst for the synthesis of ammonia consisting of a powdered and homogeneous mass containing as an active constituent nitride of lithium, calcium oxide intimately mixed with the nitride of lithium for preventing the agglomeration of the same, and a commercial zinc powder which does not itself unite with nitrogen or hydrogen at ordinary pressure and at a temperature lower than 600° C.

4. A catalyst for the synthesis of ammonia, consisting of a powdered and homogeneous mass containing as the active constituent nitride of lithium, an inert non-fusing oxide mixed with the nitride of lithium for preventing the agglomeration thereof, and commercial zinc powder containing bismuth, cadmium and lead.

5. A catalyst for the synthesis of ammonia consisting of a powdered and homogeneous mass containing as the active constituent nitride of lithium, calcium oxide intimately mixed with the nitride of lithium for preventing the agglomeration thereof, and commercial zinc powder containing bismuth, cadmium and lead.

In testimony whereof I have affixed my signature.

CHARLES URFER.